US010260885B2

(12) United States Patent
Robideaux et al.

(10) Patent No.: US 10,260,885 B2
(45) Date of Patent: Apr. 16, 2019

(54) INTERACTIVE REMOTE GUIDANCE SYSTEM FOR SEABORNE VESSELS

(71) Applicant: FUGRO CHANCE, INC., Lafayette, LA (US)

(72) Inventors: John Darius Robideaux, Lafayette, LA (US); Dickie Andrew Martin, Opelousas, LA (US); Stephen John Wesley Underwood, Beckenham (AU); Jacob Nicholas Stanley, Potts Point (AU)

(73) Assignee: FUGRO CHANCE, INC., Lafayette, LA (US)

( * ) Notice: Subject to any disclaimer, the term of this patent is extended or adjusted under 35 U.S.C. 154(b) by 62 days.

(21) Appl. No.: 14/914,396

(22) PCT Filed: Sep. 3, 2014

(86) PCT No.: PCT/US2014/053799
§ 371 (c)(1),
(2) Date: Feb. 25, 2016

(87) PCT Pub. No.: WO2015/034871
PCT Pub. Date: Mar. 12, 2015

(65) Prior Publication Data
US 2016/0223336 A1 Aug. 4, 2016

Related U.S. Application Data

(60) Provisional application No. 62/038,491, filed on Aug. 18, 2014, provisional application No. 61/873,574,
(Continued)

(51) Int. Cl.
*B63H 21/21* (2006.01)
*G01C 21/20* (2006.01)
(Continued)

(52) U.S. Cl.
CPC .............. *G01C 21/20* (2013.01); *B63B 49/00* (2013.01); *G01S 19/48* (2013.01); *G08C 17/02* (2013.01)

(58) Field of Classification Search
CPC combination set(s) only.
See application file for complete search history.

(56) References Cited

U.S. PATENT DOCUMENTS 4,164,379 A * 8/1979 Denman .............. G05D 1/0206
367/106
4,755,947 A 7/1988 Braschler et al.
(Continued)

OTHER PUBLICATIONS

International Search Report and Written Opinion; U.S. PCT Application No. PCT/US2014/053799; mailed Feb. 25, 2015.

*Primary Examiner* — Adam D Tissot
*Assistant Examiner* — Edward J Pipala
(74) *Attorney, Agent, or Firm* — Polsinelli PC

(57) ABSTRACT

Techniques for providing instructions to an operator of a sea vessel (301) via a computing device (502, 900, 1000) are described. The computing device (502, 900, 1000) can request, from another computing device (306, 309, 900, 1000), instructions regarding one or more of an intended course and action plan for the sea vessel (301), which can include at least one navigational instruction and/or deployment instruction. The computing device (502, 900, 1000) can send data to a display device (303) to cause a prompt to be displayed. The prompt can include options regarding the at least one instruction.

45 Claims, 9 Drawing Sheets

Related U.S. Application Data filed on Sep. 4, 2013, provisional application No. 61/873,330, filed on Sep. 3, 2013, provisional application No. 61/873,331, filed on Sep. 3, 2013.

(51) Int. Cl.
  *B63B 49/00* (2006.01)
  *G01S 19/48* (2010.01)
  *G08C 17/02* (2006.01)

(56) References Cited

U.S. PATENT DOCUMENTS

| | | |
|---|---|---|
| 2004/0073373 A1 | 4/2004 | Wilson |
| 2006/0224861 A1 | 10/2006 | Elwood et al. |
| 2007/0225904 A1 | 9/2007 | Pantalone et al. |
| 2010/0174488 A1 | 7/2010 | Mai et al. |
| 2010/0235484 A1 | 9/2010 | Bolan et al. |
| 2011/0141853 A1 | 6/2011 | Megdal et al. |
| 2011/0257819 A1 | 10/2011 | Chen et al. |
| 2012/0259489 A1 | 10/2012 | Hamamatsu et al. |
| 2012/0290200 A1 | 11/2012 | Kabel et al. |
| 2013/0104789 A1 | 5/2013 | Bernloehr et al. |
| 2015/0274261 A1* | 10/2015 | Bauer .................... B63B 21/26 701/21 |

* cited by examiner

INTERACTIVE REMOTE GUIDANCE SYSTEM FOR SEABORNE VESSELS

CROSS-REFERENCE TO RELATED APPLICATIONS

This application is a national stage entry of PCT/US2014/053799, which was filed on Sep. 14, 2014, which claims priority to U.S. Provisional Application 62/038,491, filed Aug. 18, 2014, which claims priority to U.S. Provisional Application 61/873,574, filed Sep. 4, 2013, which claims priority to U.S. Provisional Application 61,873,330, filed Sep. 3, 2013, which claims priority to U.S. Provisional Application 61/873,331, filed Sep. 3, 2013, said application is expressly incorporated herein in its entirety.

FIELD

The present disclosure relates to navigation satellite systems, and in particular, the present disclosure relates to an interactive remote guidance system for seaborne vessels.

BACKGROUND

In order to conduct work in offshore environments, sea vessels are often required to conduct specific tasks as well as set up and maintain the vessel in passive or controlled positions. The difficulty of mooring and conducting the offshore operations is magnified when the operations relate to offshore oil and gas related projects. Due to the complexity and criticality of deploying these operations in congested offshore oil and gas fields, vessel operators often obtain the services of an offshore survey firm to safely position and monitor the vessel during station keeping, mooring deployment and mooring retrieval once the vessel is ready to depart the site. Offshore survey firms utilize a software system interfaced to global navigation satellite system (GNSS) positioning receivers and sensory devices (e.g., gyroscopes) to position the vessel. Due to the complexity of the software system, a specialized surveyor is typically needed to interpret and control the software system. Offshore survey firms typically station such a specialized surveyor onboard the vessel to manage an onboard software system.

SUMMARY OF THE INVENTION

The interactive remote guidance system disclosed herein provides functionality where the surveyor can load a spatial database of pipelines and other seafloor assets, such as wellheads, manifolds, risers, mooring locations, and other structures, in project extents or area. The system disclosed herein allows the surveyor to define a proposed course of action. The proposed course of action can include a proposed anchor pattern and the capability of providing guidance for deployment, station keeping and eventual retrieval of the mooring systems. The proposed course of action can also include deployment of a diver team, deployment of a remote operated vehicle (ROV), sonar deployment, or seismic deployment. By its very nature, the guidance system requires expert configuration of the project's geodesy, vessel offsets between GNSS antennas and the mooring fairleads and other points of interest on the sea vessel, interaction between the software and the GNSS receivers and inertial sensors (e.g., gyroscopes), and quality control (QC) of the entire system to ensure the sea vessel is properly positioned relative to the spatial database employed.

The present system can be deployed on a variety of sea vessels. In the broadest senses, a sea vessel can be any structure that is configured to move on the seas. For example, sea vessels include dive boats, barges, derrick barges, floating production storage and offloading vessels, ships, work boats, drill ships or the like. The examples presented herein are illustrative only and other vessels are also included within the scope of this disclosure. These vessels can require navigational instruction as they are operated. The navigational instruction can include the deployment of one or more objects or personnel. Additionally, the navigational instruction can provide an intended course so that the vessel can be positioned as desired. The present system can enable the remote provisioning of offshore services, thus eliminating, in some instances, the need for onboard vessel survey staff. As will be understood by those of skill in the art, aspects of the present system can utilize existing vessel internet connectivity and/or optionally provide one or more dedicated connectivity solutions. The present system enables vessel operations described herein to continue even when beach connectivity or connectivity with other locations external to a vessel in question. Aspects of the system enable constantly manned operations centers with the ability to monitor dive boat operations in real time (less than one second of latency), monitor project plans and engage in diagnostic and quality control operations.

One example of the navigation instruction can be described in relation to a derrick barge. Derrick barges with moorings usually deploy six to eight mooring anchor lines with anchor handling vessels (AHVs). Navigational systems are required on the derrick barge and AHV for the mooring and retrieval of moorings. Anchor handling vessel offsets between GNSS antennas and the AHV stern roller for deployment and retrieval of the derrick barge's moorings are also required for precise positioning. When working with divers, a moored dive vessel is passively held on position with two or more moorings. Often three or more moorings are implemented. These moorings are typically self-deployed, dropped and retrieved by the dive vessel itself, with two forward and two aft of the vessel.

The present disclosure relates to a method and system for providing professional survey services for sea vessels without the need for survey personnel to be on board the vessel. The survey system includes navigation computer systems to provide real-time positioning of the vessel on the sea. The survey system is able to provide real-time position on the sea in spatial relationship to a database of the seafloor, pipelines, wells, and other seafloor assets along with the vessel's current or proposed locations. Additionally, the survey system is able to provide real-time positions and control of moorings and anchors as well as safe mooring, station keeping and subsequent removal of moorings and anchors at locations or project sites.

In at least one exemplary embodiment, the sea vessel can be administered remotely by an on-shore operator. The remote administration of the sea vessel can include providing the vessel with the navigation instructions as described above. In at least one embodiment, the remote administration only provides the instructions to the vessel. Yet in other embodiments, the remote administration can include controlling one or more operations on the sea vessel. For example, the operations can include deployment of a mooring.

In further embodiments, the disclosure relates to granting certain permissions or limitations on the ability of operators aboard the vessel to access, interact or control aspects of the survey system and navigation computer system. In some embodiments, the guidance computer system can include one or more servers aboard the sea vessel, which can be referred to as a local server, vessel server, navigation engine, or first computing device.

In at least one example, the computing device (or the vessel server) can request, from a second computing device (or a remote server), at least one navigational instruction, which can include one or more instructions regarding an intended course and/or an action plan for the sea vessel. In other examples, the second computing device can transmit one or more instructions to the computing device without first receiving a request from the computing device. For example, when the operators of the second computing device determine that a different instruction should be sent to the computing device, the second computing device can transmit the different instruction to the computing device.

Once the computing device receives the one or more instruction, the computing device can send data to a display device (or kiosk). The data that is sent to the display device can include instructions to cause a prompt to be displayed on the display device. The prompt can be based at least in part on the at least one instruction, which can include navigational instruction or deployment instruction. In at least one embodiment, the prompt can include options regarding the at least one instruction. The prompt can be an icon, a dialog box, or other graphical user interface item that allows for selection or other type of input. In one example, the prompt can be a dialog box with a question and two boxes, one for yes and one for no. In a specific example, the question can be: "Is the mooring deployed?" with a first icon that is selected if the answer is yes. The other icon could be a no icon. Additionally, in at least one embodiment, an additional icon can be included that is selected to request modified instructions. If the third icon is selected, the vessel operator can select it and contact an individual that created the survey with the instructions on where to place the mooring. The third option could be displayed after the no icon is selected as well along with a further icon that indicates more time is needed to properly place the mooring. In other embodiments, where navigation instructions are provided, the prompts can be specific to the navigation instructions. In other embodiments where other types of deployments are involved, the prompts can be based on the specific type of deployment involved.

The computing device can receive an input that includes a selection of at least one of the options. The computing device can store and/or transmit the selection data to the other computing device. Additionally, the computing device can send state information of the sea vessel to the other computing device. Additionally, the computing device can send state information of the sea vessel to an alternate computing device. The state information can include the received input and location information of the sea vessel. The state information can further include vessel data such as fuel, wind direction, sea conditions, and other information regarding desired characteristics of the vessel.

At least one embodiment within this disclosure pertains to a computing device for providing guidance of a sea vessel. The computing device can include at least one processor. The computing device can further include a memory storing instructions that, when executed by the at least one processor, cause the computing device to: request, from a second computing device, action instructions regarding an intended course and action plan for the sea vessel; send data to a display device to cause a prompt to be displayed on the display device based at least in part on the action instructions, the prompt including one or more options regarding the action instructions; receive an input based at least in part on the prompt, the input including a selection of at least one of the one or more options, the input being stored in the memory; and send state information of the sea vessel to the second computing device or to another computing device, the state information including the stored input and location information of the sea vessel. The action instructions can include navigational instructions, or deployment instructions, or both. Additional types of action instructions are possible within this disclosure.

BRIEF DESCRIPTION OF THE DRAWINGS

Implementations of the present application will now be described, by way of example only, with reference to the attached figures, in which.

DETAILED DESCRIPTION

Figure 1:
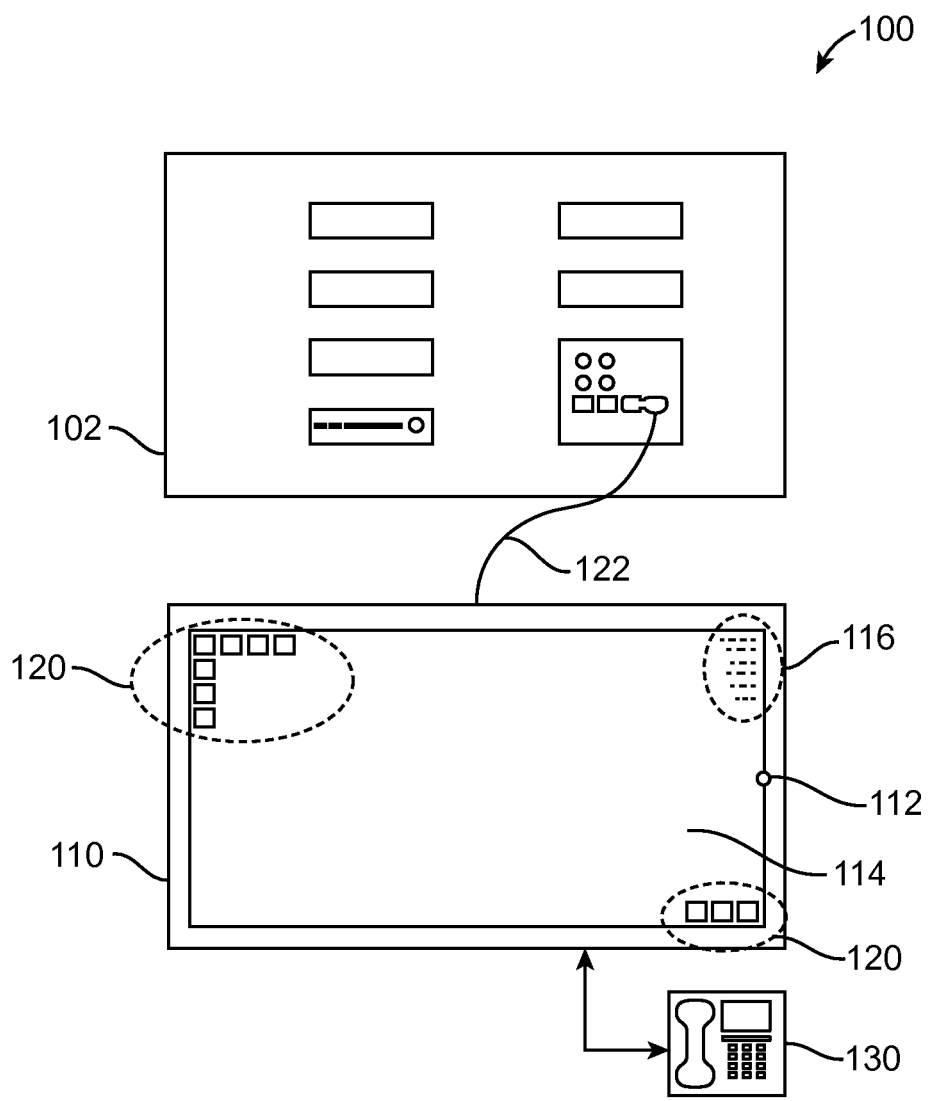
FIG. 1 illustrates an example of a system, according to certain aspects of the subject technology.

It will be appreciated that for simplicity and clarity of illustration, where appropriate, reference numerals have been repeated among the different figures to indicate corresponding or analogous elements. In addition, numerous specific details are set forth in order to provide a thorough understanding of the implementations described herein. However, the implementations described herein can be practiced without these specific details. In other instances, methods, procedures and components have not been described in detail so as not to obscure the related relevant function being described. Also, the description is not to be considered as limiting the scope of the implementations described herein. It will be understood that descriptions and characterizations of embodiments set forth in this disclosure are not to be considered as mutually exclusive, unless otherwise noted.

At least one embodiment within this disclosure is a computing device for providing guidance of a sea vessel. The computing device can include at least one processor and memory storing instructions. When the instructions are executed by the processor, the instructions can cause the computing device to: request, from a second computing device, action instructions regarding an intended course and action plan for the sea vessel; send data to a display device to cause a prompt to be displayed on the display device based at least in part on the action instructions, (the prompt can include one or more options regarding the action instructions); receive an input based at least in part on the prompt, (the input including a selection of at least one of the one or more options, the input being stored in the memory); and send state information of the sea vessel to the second computing device or to another computing device, (the state information including the stored input and location information of the sea vessel).

At least one embodiment within this disclosure is a computing device for facilitating remote guidance of a sea vessel. The computing device can comprise at least one processor and at least one memory storing instructions that, when executed by the at least one processor, cause the computing device to perform operations. The operations can include: obtaining a project list from a gateway server, (the project list relating to one or more ongoing projects on one or more sea vessels); receiving a subscription list from one or more client computing devices; obtaining navigation data stored in the memory if one or more subscriptions exist, (the navigation data generated by the gateway server); sending the navigation data to the one or more client computing devices; and causing the sent navigation data to be displayed on a display device of the one or more client computing devices.

At least one embodiment within this disclosure is a remote navigational control system for a sea vessel. The system can include a local server unit contained within a sea vessel. The local server unit can have a processing unit and storage unit. The local server unit can include modules to process position data of the sea vessel. The local server unit can be configured to communicate with a user interface. The system can further include a second server unit remote from the local server unit. The second server unit can be located outside of the sea vessel. The local server unit can be configured to processes instructions from the second server unit. The instructions can, in at least one embodiment, be selected from among only a first set of instructions. The local server unit can be configured to process instructions from the user interface; the instructions can consist of instructions selected from among only a second set of instructions. In at least one embodiment, the first and second set of instructions is not identical.

In at least one embodiment, a remote navigational control system for a sea vessel includes a sea vessel server unit contained within a sea vessel. The sea vessel server unit can have a processing unit connected with a storage unit and the storage unit can contain undersea map data. The sea vessel server can be configured to communicate with an operator interactive unit having a display screen, a processing unit and an input device capable of receiving input from an operator. The sea vessel server can further be configured to receive commands from the interactive unit and global positioning data from a plurality of global position receivers on the sea vessel. The control system can also include a remote server having a processor. The remote server can be configured for wirelessly issuing commands to the sea vessel unit. The sea vessel server processing unit can be configured to process global positioning data vessel in relation to the undersea map data and, based on the processed data, display vessel position on the display screen. The sea vessel server unit can receive commands from among a first of commands received from the remote server and receive commands from among a second set commands received from the operator interactive unit, wherein the first set of commands is different from the second set of commands.

FIG. 1 illustrates an example of an interactive remote guidance system 100, according to certain aspects of the subject technology. The interactive remote guidance system 100 includes an office assisted remote service (OARS) unit 102 and a kiosk terminal 110. The kiosk terminal 110 includes a touchscreen 112 for displaying a user interface 114. The user interface 114 includes status information 116, as well as daylight readable features and controls 120. The kiosk terminal 110 is coupled to a voice terminal 130. In at least one embodiment, the voice terminal 130 can be handset terminal that resembles a typical telephone, cellular phone, or satellite phone. Such systems can provide a direct connection between a vessel and a control center, and enable verbal collaboration regarding status, project plan amendments, etc. The voice terminal 130 can provide for speakerphone capability. In other embodiments, the voice terminal 130 can be a headset that can be coupled to OARS unit 102. The headset can be microphone and a speaker including at least one of a loud speaker or one that is designed to be worn by an individual. In other embodiments, the headset can be a microphone, loud speaker, and a speaker configured to be worn by the individual. Other types of voice terminals 130 can be implemented as well so that the vessel operator can contact a remote individual. In at least one embodiment, the voice terminal can be separate from the other components presented herein. The OARS unit 102 is communicatively coupled to the kiosk terminal 110 via a communication link 122. The communication link 122 can be wired (e.g., Ethernet) or wireless (e.g., WI-FI™, BLUETOOTH®, ZIGBEE®).

In this example, the OARS unit 102 and the kiosk terminal 110 are located on board a sea vessel. In at least one example, the OARS unit 102 can remain onboard the sea vessel, and the kiosk terminal 110 can be located outside the sea vessel (e.g., on a different sea vessel or on-shore). In another example, the kiosk terminal 110 can be portable. In another example, the kiosk terminal 110 can be a preinstalled portion of the vessel, such as a navigational unit that is currently in operation or a general purpose touch screen. The kiosk terminal 110 terminal can also be semi-permanently mounted.

The OARS unit 102 can receive instructions from a second computing device. The instructions can be classified as action instructions in that the instructions provide data regarding the current action to be taken by the vessel. The current action can be navigation instructions, deployment instructions, or other instructions that require the vessel operator to perform an action. The second computing device can be located off of the vessel. In at least one embodiment, the second computing device is configured to be located in a land based office. In yet other embodiments, the second computing device can be located on a different vessel.

In at least one embodiment, the OARS unit 102 can request, from a second computing device, the action instructions for the sea vessel including at least one instruction that requires that the sea vessel perform at least one action. In at least one embodiment, the action instructions can be instructions that the sea vessel continue a present course. In other embodiments, the OARS unit 102 can just receive the action instructions without making a request. Additionally, in order to facilitate discussion with the personnel operating the second computing device, a voice communication terminal 130 can be provided. In at least one embodiment, the OARS unit 102 can be coupled directly to a communication transmitter/receiver. In other embodiments, the OARS unit 102 can be coupled to the voice communication terminal 130 to provide a communication link. For example, when the OARS unit 102 is completely portable along with the kiosk terminal 110, the voice communication terminal can be configured to receive and transmit data from the OARS unit 102 to the second computing device or to another computing device.

In at least one embodiment, the OARS unit 102 can be configured to be accessible by authorized personnel only. In at least one embodiment the OARS unit 102 can be configured to have a connector that allows for authorized personnel to gain access to the data on the OARS unit 102 and perform configuration and/or troubleshooting of the OARS unit 102. The connector can be a specifically configured connector or it can be a standard connector such as a universal serial bus (USB) connector. In another embodiment, the operators of the sea vessel, such as a ship captain or crewmembers, can have direct access to the OARS unit 102 via a user interface connector. The user interface connector can be a single connector or include multiple connectors. If multiple connectors are provided, individual connectors can be provided for different types of devices including a display, such as computer screen, and input device such as a keyboard or mouse, or a touch sensitive screen. In other embodiments, the only access that the vessel crew has access to is the kiosk terminal 110 as described above. In at least one embodiment, the kiosk terminal 110 can be directly coupled to the OARS unit 102. In other embodiments, the kiosk terminal 110 can be located in a different location from the OARS unit 102. For example, the OARS unit 102 can be located in a region proximate to the transmitter/receiver on the vessel and connected via a wired or wireless connection. The kiosk terminal 110 can in turn be located proximate to the captain or navigator of the vessel. In this way the kiosk terminal 110 is available for the captain or navigator to interact with the kiosk and respond to the prompts that are displayed on the kiosk terminal 110.

In some embodiments, the operator of the OARS unit 102 is abstracted from the sea vessel or prevented from direct access to the OARS unit 102. For example, the OARS unit 102 can be encased in a plastic or metal body with no apparent user interface physically attached thereon. Instead an operator on the sea vessel can interact with the OARS unit 102 wirelessly. Accordingly, the OARS unit 102 can be accessed using external user interfaces such as a desktop personal computer, a wireless kiosk, a mobile unit, a tablet computing device, or a mobile smartphone. Such external user interfaces can include one or more processors and storage devices and other computer components known in the art. Accordingly, operators can be prevented or discouraged from interfering with the OARS unit 102.

The operators can have certain permissions or limitations on the ability to access, interact or configure the OARS unit 102. For example, the operator or user interface can be restricted to sending certain instructions or commands, and/or the OARS unit 102 can be restricted from processing or receiving particular instructions or commands from the operator user interface. Accordingly, the OARS unit 102 can process or receive only a particular set of instructions or commands from the user interface. The reason for such restriction is due to the highly complex nature of the survey systems. Due such complexity, a specialized surveyor expert is required to interact with much of the survey and navigation systems. However, there are a limited set of functionalities that are useful to the operators aboard the sea vessel. Accordingly, there can be a set of instructions or commands (or at least one navigational instruction) available to an operator aboard the sea vessel.

Such set of instructions can be tailored to the particular type of vessel or project the vessel is engaged in. For example, these can include a dive vessel, a barge, a pipe-laying barge, a derrick barge, a drill ship, and a seismic survey vessel. In this respect, the set of instructions can be varied for each type of vessel. User interface units as well as the vessel servers (e.g., the OARS unit 102) can be placed in multiple places around the sea vessel including fore and aft, enabling ease of access to the sea vessel crew. When multiple user interface units or kiosks are employed, each can have its own independent view and connection with a respective vessel server.

The OARS unit 102 can send data to a display device (e.g., the touchscreen 112 of the kiosk terminal 110) to cause a prompt to be displayed on the display device (e.g., via the user interface 114) based at least in part on the at least one instruction. In some aspects, the prompt includes one or more options, such as those that were described above, regarding the at least one instruction. In this example, the one or more options can be represented as at least a portion of the controls 120.

The at least one instruction can include adjustment and maneuvering of the map. This can include zoom functionalities (i.e. zoom out and zoom in), movement and orientation of the map, mooring control, anchor manipulation, dropping and retrieval of anchor or mooring, or control of such moorings and anchors, event recordation, monitoring or selection of other vessels or assets, and map display options. In at least one embodiment, the at least one instruction can also include setting destination points, speed, and maneuvering the vessel.

The OARS unit 102 can receive an input based at least in part on the prompt provided for display on the kiosk terminal 110. In some aspects, the input includes a selection of at least one of the one or more options. The input can be stored in a memory of the OARS unit 102 and/or a memory of the kiosk terminal 110. In turn, the OARS unit 102 can send state information of the sea vessel to the other computing device. In some aspects, the state information includes the stored input and location information of the sea vessel. The OARS unit 102 can facilitate a request for updated action instructions from the other computing device based upon updated information from at least one of weather conditions, or change in action plans of the vessel.

The OARS unit 102 can receive various inputs to aid in determining the position of the vessel. The OARS unit 102 can receive data from the global navigation satellite system (GNSS) receivers to calculate the position of the sea vessel. For example, the OARS unit 102 can obtain the location information from at least one global navigation satellite system (GNSS) receivers. In an aspect, the at least one GNSS receiver can be communicatively coupled to the OARS unit 102, and located on board the sea vessel. The at least one GNSS receiver includes satellite connections to one or more of a global positioning system (GPS), Galileo system, Global Navigation Satellite System (GLONASS) and BEIDOU™ system. In some aspects, the location information relates to a geographical position of the sea vessel.

The OARS unit 102 can obtain survey data relating to a seafloor environment. In some aspects, the survey data includes location information for one or more objects associated with the seafloor environment. For example, the OARS unit 102 can obtain map data of the subsea geography, seafloor landscape, including natural landscape and man-made structures and assets including, pipelines, wells, and other seafloor assets. The position of the sea vessel can then be spatially determined relative to such structures. The moorings, service ships, divers, as well as other equipment, assets and vessels can also be determined relative to the primary vessel and map data.

Inertial information systems regarding the sea vessel can also be employed, and such information can be provided to the OARS unit 102 to aid in determination of the sea vessel position. Inertia information can be obtained for example by means of inertial sensors including, for example gyroscopes. Accordingly, the combination of inertial sensing systems along with GPS can aid in more accurate location and positioning of the sea vessel.

The OARS unit 102 can obtain navigation data relating to the anchoring of the sea vessel including positioning information of an intended location of an anchor position. The OARS unit 102 can provide navigation instructions to the display device regarding the anchor position. The OARS unit 102 can provide, upon arrival in a proximate location of the anchor position, a prompt that requests confirmation of deployment of an anchor or mooring (hereinafter simply referred to as an anchor, but can optionally include a mooring). The OARS unit 102 can store, upon receipt of the confirmation of the deployment of the anchor, an actual location of the anchor position where the anchor was deployed. The OARS unit 102 can send the actual location of the anchor position to the other computing device.

Figure 2:
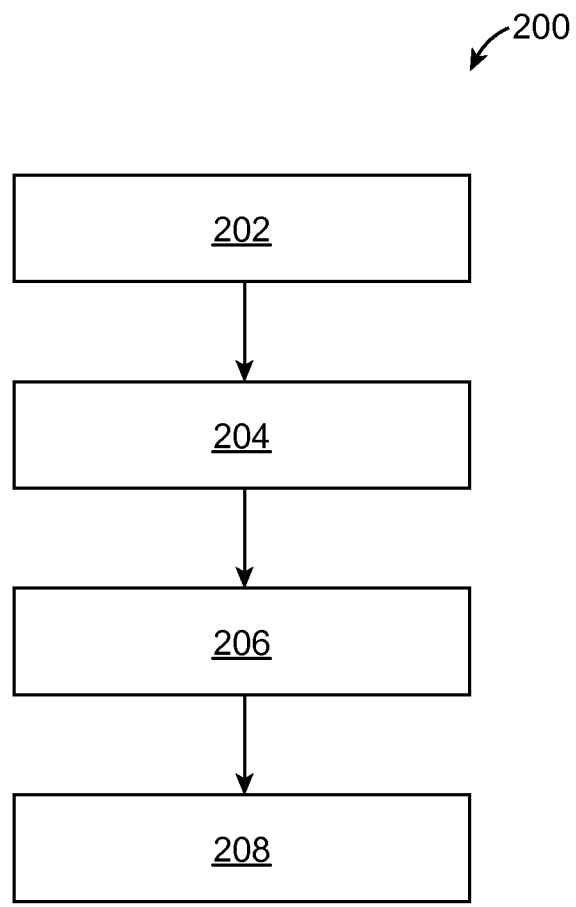
FIG. 2 illustrates a flowchart of an example process for providing instructions to a sea vessel, according to certain aspects of the subject technology.

FIG. 2 illustrates a flowchart of an example process 200 for providing guidance of a sea vessel on a first computing device, according to certain aspects of the subject technology. The example process 200 is provided merely as an example and additional or fewer steps can be performed in similar or alternative orders, or in parallel, within the scope of the various embodiments described in this specification.

The first computing device can request, from another computing device, action instructions regarding an intended course and action plan for the sea vessel including at least one instruction that requires that the vessel perform at least one action 202. For example, this can include navigational or deployment instructions. For example, the navigational instructions can provide details regarding an intended point that an anchor or mooring is to be deployed. The deployment instructions can instruct the operator when to deploy the anchor or mooring.

The first computing device can send data to a display device to cause a prompt to be displayed on the display device based at least in part on the at least one navigational instruction 204. The prompt can include one or more options regarding the at least one navigational instruction.

The first computing device can receive an input based at least in part on the prompt 206. In an aspect, the input includes a selection of at least one of the one or more options. The input can be stored in a memory of the first computing device.

The first computing device can send state information of the sea vessel to the second computing device 208. The state information can include the stored input and location information of the sea vessel.

Figure 3:
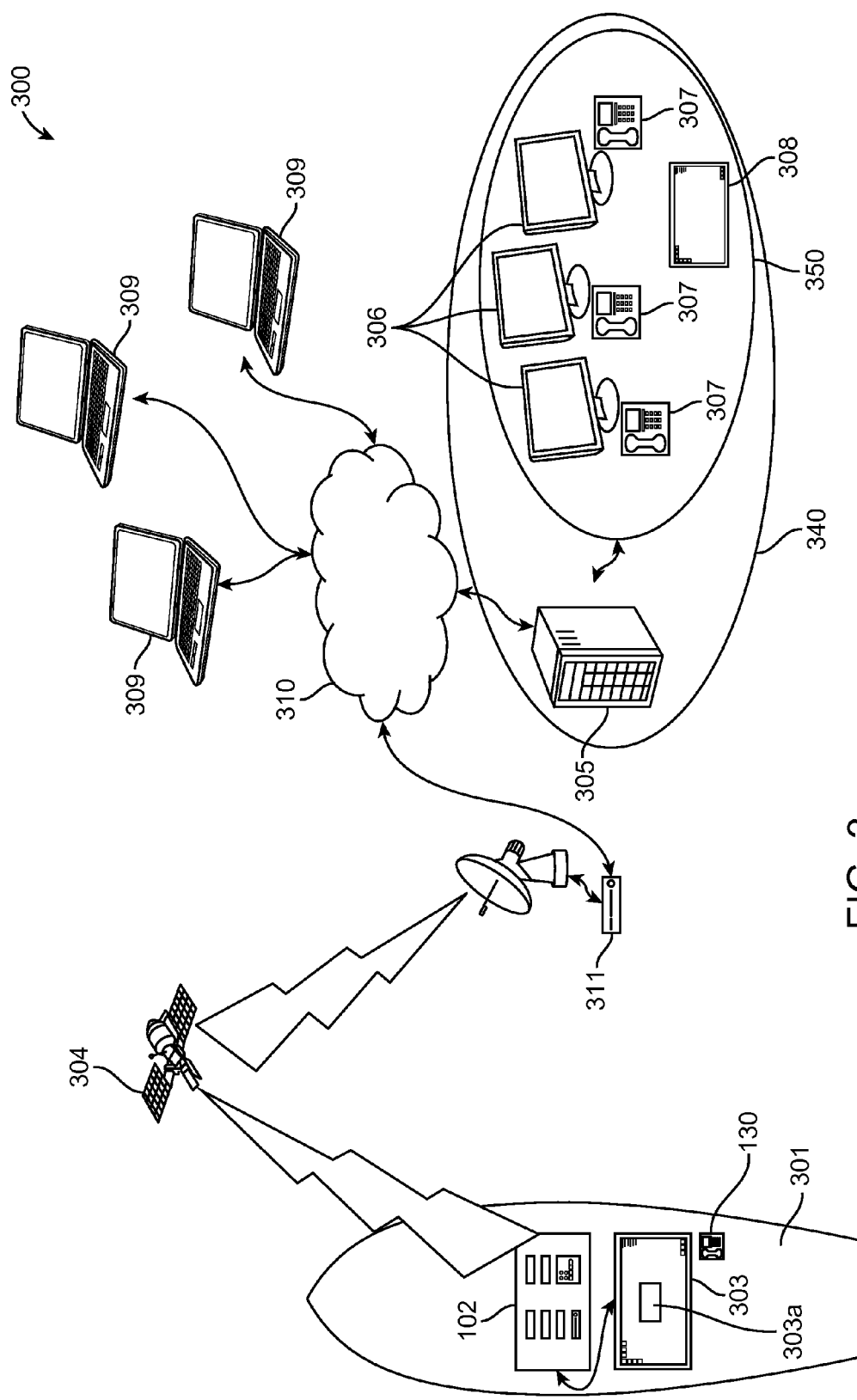
FIG. 3 illustrates an example of an environment implementing the system, according to certain aspects of the subject technology.

FIG. 3 illustrates an example of an environment 300 implementing the interactive remote guidance system, according to certain aspects of the subject technology. In FIG. 3, a sea vessel 301 located at sea is illustrated, along with a vessel server (e.g., the OARS unit 102) on board the sea vessel 301. Indicated by arrows, the OARS unit 102 is communicatively coupled to a display device 303 (e.g., the kiosk terminal 110 of FIG. 1). In this example, the display device 303 is also located on board the sea vessel 301. As discussed above, the display device 303 can include a wired or wireless link to the OARS unit 102. The display device 303 includes a display 303*a* and a telephone 130.

An OARS survey control center 350 can be integrated with a remote gateway server 305, or can be a separate computing device having a user interface that communicates to the remote gateway server 305 over a wired or wireless communication link. The gateway server 305 communicates with control center computing devices 306. In this example, the control center computing devices 306 are each coupled to a respective communication devices 307 (e.g., telephone) and a user interface 308. Consequently, the surveyors operating the control center 350 can communicate with the OARS unit 102, and control the OARS unit 102 and/or the display device 303. In at least one embodiment, the remote gateway server 305 can be located on the same intranet 340 as the survey control center 350.

The remote gateway server 305 has connectivity to one or more satellite communication links to the OARS unit 102 via a routing device 311. The satellite 304 enables communication between the vessel server 102 and the remote gateway server 305, located on land. As there can be multiple vessels employing the navigation systems, the remote gateway server 305 can host connections with multiple vessels. An operator of the remote gateway server 305, unlike the operator at a user interface aboard the vessel, has full control of the OARS unit 102 via the communications link issuing instructions or commands to the OARS unit 102. Accordingly, the remote gateway server 305 operator can be a technical expert surveyor for operation of the navigation system. An operator of the remote gateway server 305 can see real-time positioning and state of vessel operations. Additionally, the remote gateway server 305 operator can monitor the health and status of the OARS unit 102. The health and status of the OARS unit 102 can include one or more of the following: storage space, storage integrity, operational status, error messages, data transmission status, uplink status, downlink status, and other similar status or health features. In at least one embodiment, as described above, the OARS unit can obtain vessel status and health, thereby allowing the remote gateway server 305 to obtain the vessel status and health. The health and status of the vessel can include one or more of fuel status, engine operating status, navigational reception status, ROV status, mooring status, stationary lock status, or other similar health and status details. Moreover, the remote gateway server 305 has power to configure the OARS unit 102 to modify project configuration, for example, change the OARS unit 102 configuration to be specific to dive vessels, barges, pipe-laying barges, derrick barges, drill ships, or seismic survey vessels, or to modify other goals or actions. The remote gateway server 305 can also conduct diagnostics or quality control on the OARS unit 102.

Moreover, the remote gateway server 305 has the power to configure, read or change the map data, or geographical information system (GIS) data, in the OARS unit 102 or that which is being displayed on the user interface 303*a* of the kiosk terminal 303. The remote gateway server 305 also can configure proposed anchor patterns, resolve final tie data, and perform administrative tasks on the OARS unit 102. In other embodiments, the OARS unit 102 can be configured to determine desired navigation changes based upon sensed local data at the vessel. The local data can be local current, local tide, local wind speed, local wave direction, local wave height, among other local information that can change the navigational operation of the vessel.

The remote gateway server 305 accordingly can issue commands or instructions to the OARS unit 102, and can thereby also control the user interface 303a of the kiosk terminal 303. Accordingly to accomplish control, the remote gateway server 305 has a set of instructions or commands that can be sent and received by the remote gateway server 305 and processed to execute such commands and instructions. These instructions and commands include, but are not limited to, real-time positioning, current vessel operations, current vessel deployments, vessel status and health, OARS unit status and health, configure or modify projection configuration, GIS or mapping data, proposed mooring patterns, proposed anchor patterns, resolve final tie data, and perform administrative tasks on the OARS unit 102.

The display device 303 can also include a communications device such as a voice communication connection (e.g., the voice communication terminal 303b) or Internet connection allowing for direct communication with the remote gateway server 305 operator. The remote gateway server 305 operator can also view in real-time what is displayed on the display 303a of the display device 303, and can control what is displayed. By controlling the OARS unit 102, the remote gateway server 305 operator can configure and control what is shown on the user interface as well as what instructions and commands the vessel operator can send to the OARS unit 102. For example, the commands can be limited to requested commands. In other embodiments, the kiosk can be configured to receive special control information upon entry of a password or other authentication data from the vessel operator. In other embodiments, the OARS unit 102 can be configured to receive different authentication data from different personnel so that other features of the OARS unit 102 can be enabled, performed, modified or otherwise controlled.

Accordingly, the OARS unit 102 is able to receive and process a first set of instructions, commands or requests from the remote gateway server 305 which sends the same, while also able to receive and process and second set of instructions, commands or requests from the user interface 308. For simplification, reference to instructions, commands and or requests are considered the same herein—communication to different servers or computers to control or cause an action.

In some embodiments, the first set of instructions includes all possible instructions for full control of the OARS unit 102 as well as control of the user interface (or the display 303a) on the vessel. The first set of instructions can include all the actions discussed above regarding the remote gateway server 305. Instructions and commands include, but are not limited to, real-time positioning, current vessel operations, current vessel deployments, vessel status and health, OARS unit status and health, configure or modify projection configuration, GIS or mapping data, proposed mooring patterns, proposed anchor patterns, resolve final tie data, and perform administrative tasks on the OARS unit 102. In some embodiments, the second set of instructions contains a very limited set of instructions, for example restricted to the permissions or limitations noted above for the vessel operator of the display device 303. These include, for example navigation of the vessel 301, maneuvering of the vessel 301, anchor manipulation, map orientation manipulation, event recordation, and display options. The first set of instructions which can be issued by the remote gateway server 305 can include these and can include the whole host of additional instructions required for full control of the OARS unit 102.

Accordingly, the second set of instructions is limited to a specific set of instructions. This accordingly can exclude configuring the instructions, software modules or working of the software stored thereon. This can also exclude administration, such as control of the workings of the navigation or survey software. This also excludes any control of the remote gateway server 305. Additionally excluded are quality control and instructions for changing the manner in which the vessel position is calculated. Permissions and limitations can be adjusted by the remote gateway server 305.

Accordingly, the vessel server 102 processes instructions from the remote gateway server 305 consisting of instructions selected from among only a first set of instructions, and the OARS unit 102 processes instructions from the user interface 308 consisting of instructions selected from among only a second set of instructions, where the first and second set of instructions differ. Such differences can allow for the complete control by the remote gateway server 305 whereas limited functionality of the system, such as position, deployment instructions, anchoring, and mooring, is only needed by the sea vessel personnel via the display device 303.

Accordingly, the first set of instructions from the remote gateway server 305 can overlap with the second set of instructions, but are not identical. The second set of instructions can be capable of being given by the user interface 308 and can be configured by the remote gateway server 305. The remote gateway server 305 is capable of configuring the second set of instructions to include instructions particularized to the type of sea vessel, for example, whether the sea vessel is a dive boat or a derrick barge. In other embodiments, the first and second set of instructions capable by each server are different and do not overlap. In this case, the remote gateway server 305 would have a limited set of instructions the OARS unit 102 would carry out, but would be excluded from certain instructions such as navigation of the vessel 301 or mooring control, and the vessel user interface (e.g., the display device 303) would have a limited set of instruction, but would exclude configuring, or administering or quality control of the vessel 301 or remote gateway server 305.

In addition, one or more client computing devices 309 having at least one processor and storage medium, display and user input device, can communicate with the remote gateway server 305 via the Internet 310. The client computing devices 309 can be configured to operate as passive devices (e.g., read only) but can include certain functionalities such as map orientation to view the position of the sea vessel 301 and various locations near a target site. Both the remote gateway server 305 and control center computing devices 306 can have one or more processors and storage medium having executable software modules for carrying out the system disclosed herein. Client computing devices 309 can be configured to provide secure web browser interfaces to OARS-based (102) projects. Client computing devices 309 can be further configured to enable viewing of OARS (102) information in a read-only manner.

In the embodiment illustrated in FIG. 3, the remote gateway server 305 can provide for distribution of data received from the OARS unit 102 thereby reducing the bandwidth required to transmit information from the OARS unit 102 to the plurality of client devices. This is helpful when the transmission link between the OARS unit 102 and another device is over a low bandwidth, for example a satellite connection. Additionally, when data is being transmitted to a single location, it provides for a substantially real-time update of the data since the data is only transmitted a single time. For instance, rather than transmitting the position information to four different devices, the position information is transmitted a single time to the remote gateway server 305. This enables other data to be transmitted rather than repeating the transmission of the same data. In this way, different data can be transmitted without repetitious transmission of the same data.

Figure 4:
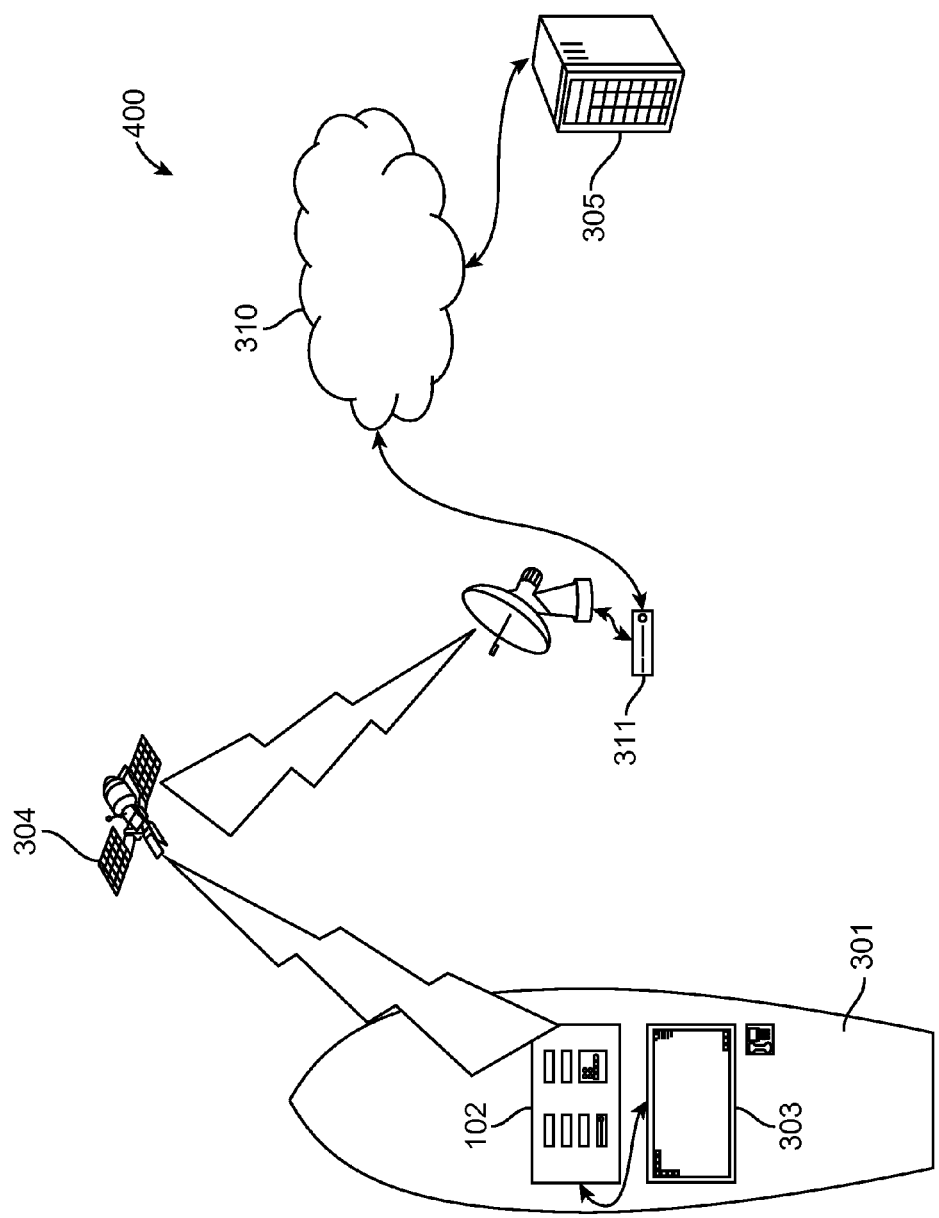
FIG. 4 illustrates another example of an environment implementing the system, showing the data flow, according to certain aspects of the subject technology.

FIG. 4 illustrates another example of an environment 400 implementing the interactive remote guidance system, according to certain aspects of the subject technology. The environment 400 includes a sea vessel 301 having a vessel server 102 on board the sea vessel 301. A user interface or kiosk 303 is also illustrated. Further, a satellite 304 communicatively couples, via the Internet 310 and router 311, the vessel server 102 to the gateway server 305. The sea vessel server 102 can conduct multiple functionalities or actions including a first set of instructions (e.g., 1, 2, 3, 4 . . . n), as well as a second set of instructions (e.g., A, B, C, D . . . Z), where each letter or number represents an exemplary instruction. The user interface 303 is limited to only passing instructions of the second set of instructions, (e.g., A, B, C, D . . . Z), to the vessel server 102. The second set of instructions represents various functions or instructions, including anchor or mooring manipulations, event recording, display options, as well as other vessel server 102 instructions or functions discussed. On the other hand, the vessel server 102 can be configured to carry out not only the second set of instructions but also the first set of instructions (e.g., 1, 2, 3, 4, . . . , n), which include calculations regarding vessel position, processing of inertial or GNSS data in relation to a map or navigational data, as well as other listed instructions received from the gateway server 305. In an aspect, the gateway server 305 instructs the vessel server 102 with respect to the first and second sets of instructions, or can be limited to the first set of instructions.

Figure 5:
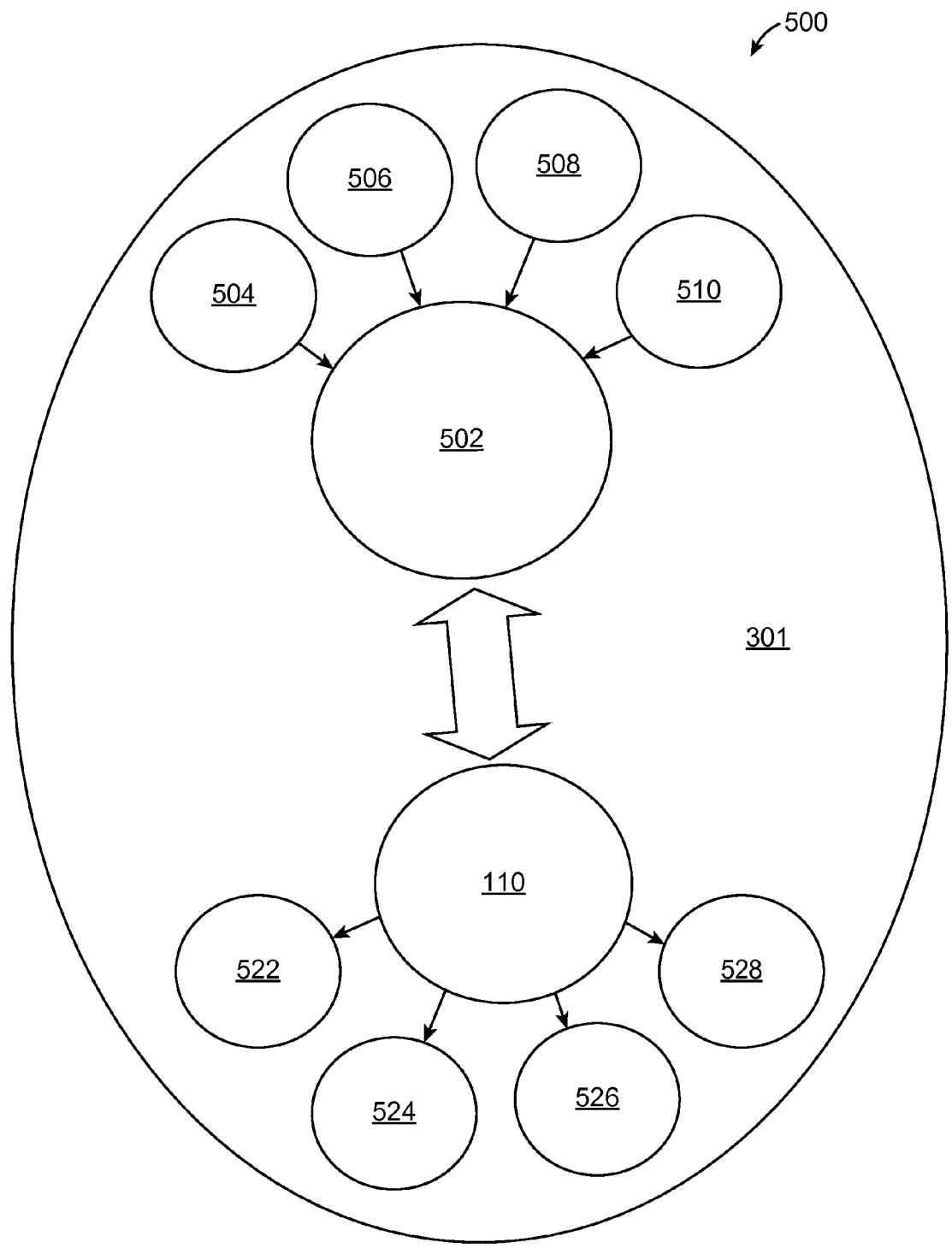
FIG. 5 illustrates an example of a system on a sea vessel, according to certain aspects of the subject technology.

FIG. 5 illustrates an example of the interactive remote guidance system 500 (e.g., 100 from FIG. 1) on a sea vessel (e.g, 301 from FIGS. 3-4), according to certain aspects of the subject technology. In FIG. 5, the system 500 includes a first computing device 502, which can be configured to process various types of data including but not limited to a vessel position 504, a vessel heading 506, map data 508, and other publications 510 that include data that is to be displayed or requires a response, or both. The first computing device 502 can be a navigation engine, such as an OARS unit (as described above). The interactive remote guidance system also includes a kiosk 110 that is subscribed to the first computing device 502. The kiosk can be configured to display a vessel position 522, a vessel heading 524, map data 526 and other subscriptions 528 that correspond to the other publications 510. In some aspects, the kiosk 110 is coupled to the first computing device 502. In this respect, the kiosk 110 can be an input device such a display device and a user interface displayed on the display device. As illustrated the data from the vessel position 504, the vessel heading 506, the map data 508 and other publications 510, flows through the first computing device 502 to the kiosk 110 and is displayed as the vessel position 522, the vessel heading 524, the map data 526 and the other subscriptions 528. In at least one embodiment, a single first computing device 502 can be provided on the sea vessel and a plurality of kiosk 110 can be provided on the sea vessel to enable multiple points of interaction. For example, the kiosk 110 can be located on one or more of the bridge, navigation room, control room, diver chambers, and ROV control chambers, either on deck or at another location as necessary to provide the instructions. While only flow of data to the kiosk 110 is presented, the data obtained from the kiosk 110 in response to a prompt can be transmitted back to the first computing device 502.

The interaction between the first computing device 502 in the form of a navigation engine and the kiosk 110 will be described further in FIG. 6.

Figure 6:
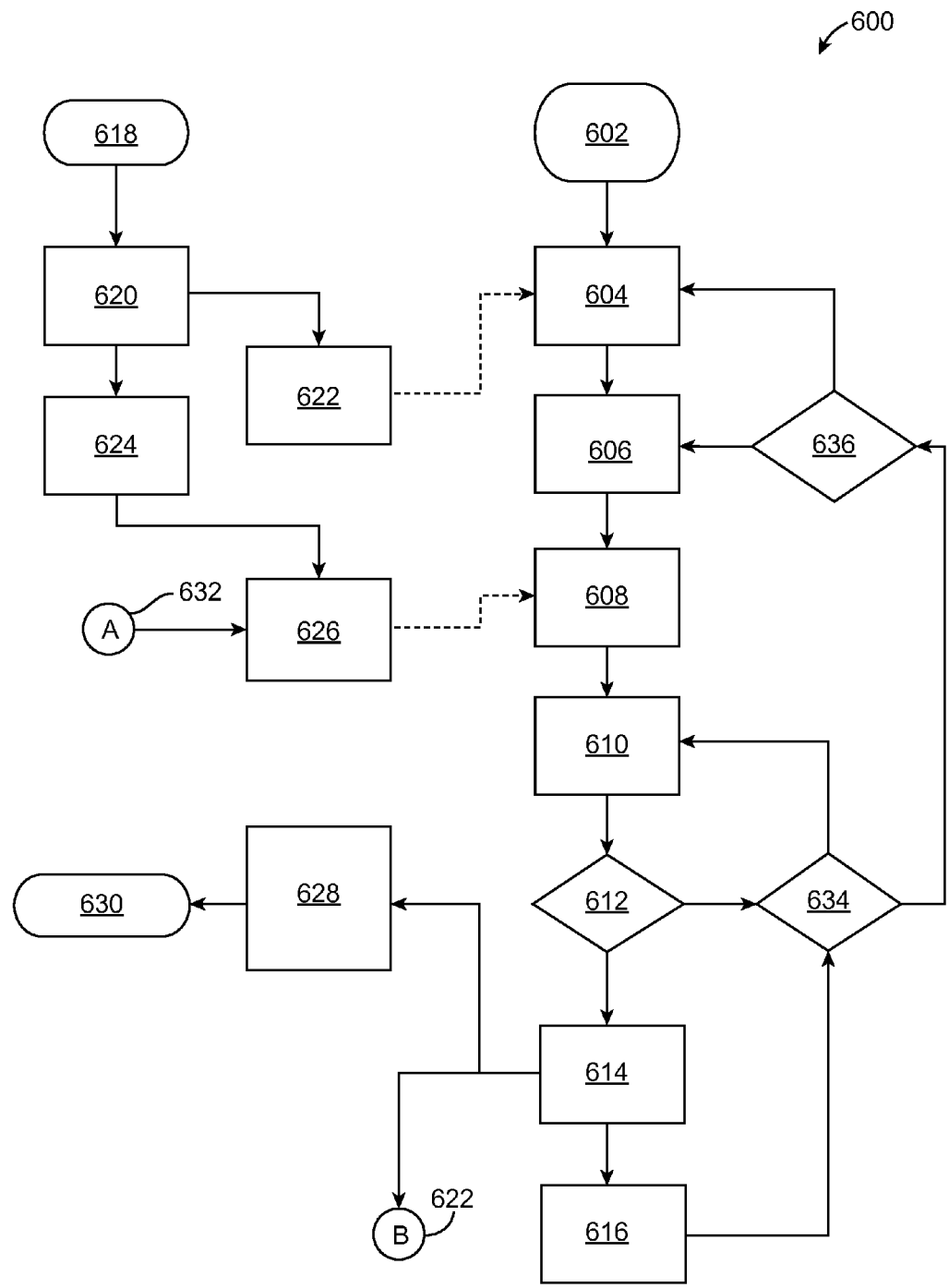
FIG. 6 illustrates a flowchart of an example process for system described in FIG. 5, according to certain aspects of the subject technology.

FIG. 6 illustrates a flowchart of an example process 600 for the interactive remote guidance system described in FIG. 5, according to certain aspects of the subject technology. The example process 600 is provided merely as an example and additional or fewer steps can be performed in similar or alternative orders, or in parallel, within the scope of the various embodiments described in this specification.

In step 602, the navigation engine implemented on a vessel server (e.g., the OARS unit 102 of FIG. 1) can be started (or initialized). The vessel server obtains a list of client computing devices (or clients) 604. The vessel server performs a series of steps for each client computing device 606. In this respect, the vessel server gets a subscription list corresponding to the current client computing device 608. In turn, the vessel server performs a series of steps for each of the current client's subscriptions 610. In this respect, the vessel server can determine if data from the navigation engine should be sent to the current client computing device 612. If so, the vessel server can send the data to the current client computing device 614. The sent data can then be stored, or cached, by the vessel server 616. In either case, the vessel server can then determine if all of the current client's subscriptions have been processed 634. If not, the vessel server returns to step 610 and determines the next subscription for the current client. If the vessel server has completed processing all of the current client's subscriptions, it can then determine if there are more clients to process 636. If so, the vessel server returns to step 606 and determines the next client to process. In some aspects, the navigation engine data is received by the client computing devices 628. In turn, the received data is displayed on a kiosk display 630. In another aspect, the navigation engine data is received by the gateway server and proceeds to step 622 for further processing, which will be described further in FIG. 8.

In step 618, a kiosk client (or display device external to the vessel server) can be started (or initialized). The kiosk can connect to the navigation engine 620 to receive and display the navigation engine data. The kiosk can then add itself to the list of connected clients maintained by the navigation engine 622. In turn, the kiosk can generate the list of subscriptions for which it needs to receive corresponding data from the navigation engine 624. The kiosk can then send its list of subscriptions to the navigation engine for processing 626. The kiosk then waits for the requested data to arrive in step 628.

Figure 7:
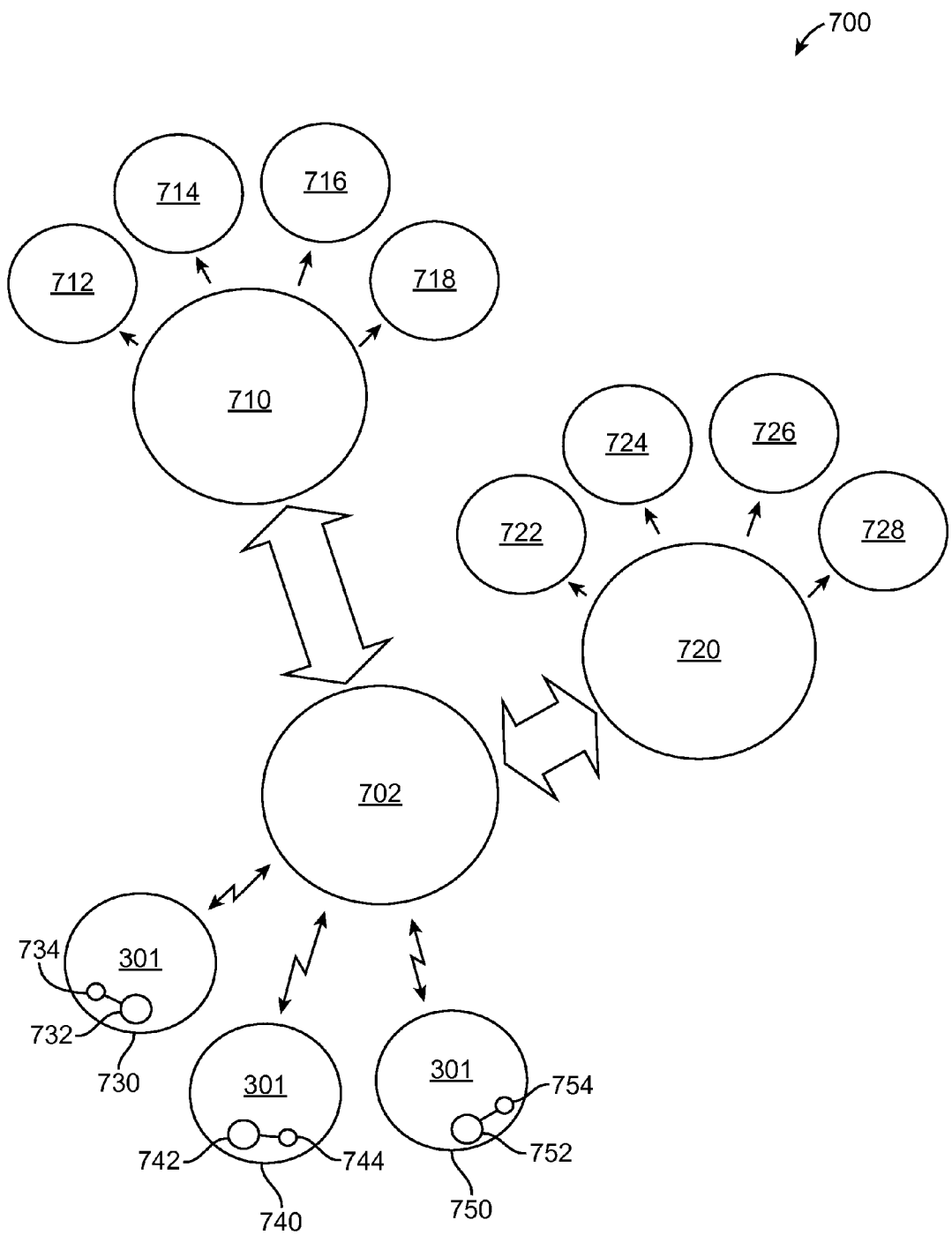
FIG. 7 illustrates an example of a gateway server, according to certain aspects of the subject technology.

FIG. 7 illustrates an example of the interactive remote guidance system with a gateway, according to certain aspects of the subject technology. In FIG. 7, the system 700 includes a gateway server 702 and clients 710 and 720. The gateway server 702 is communicatively coupled to the clients, 710 and 720, as well as sea vessels 730, 740 and 750 via wired and/or wireless communications. The client 710 subscribes to state information relating to one or more of the vessels 730, 740 and 750 such as vessel position 712, vessel heading 714, map data 716 and other subscriptions 718. Similarly, the client 720 subscribes to state information relating to one or more of the vessels 730, 740 and 750 such as vessel position 722, vessel heading 724, map data 726 and other subscriptions 728. The gateway server 702 can be subscribed to receive data from a navigation engine running on each of the sea vessels 730, 740 and 750. The interaction between the gateway server 702 and both the clients, 710 and 720, and the sea vessels 730, 740, 750 will be described in FIG. 8. As illustrated the first sea vessel 730 includes an OARS unit 732 and a kiosk 734. Likewise, the second sea vessel 740 includes an OARS unit 742 and a kiosk 744. Additionally, the third sea vessel 750 includes an OARS unit 752 and a kiosk 754.

Figure 8:
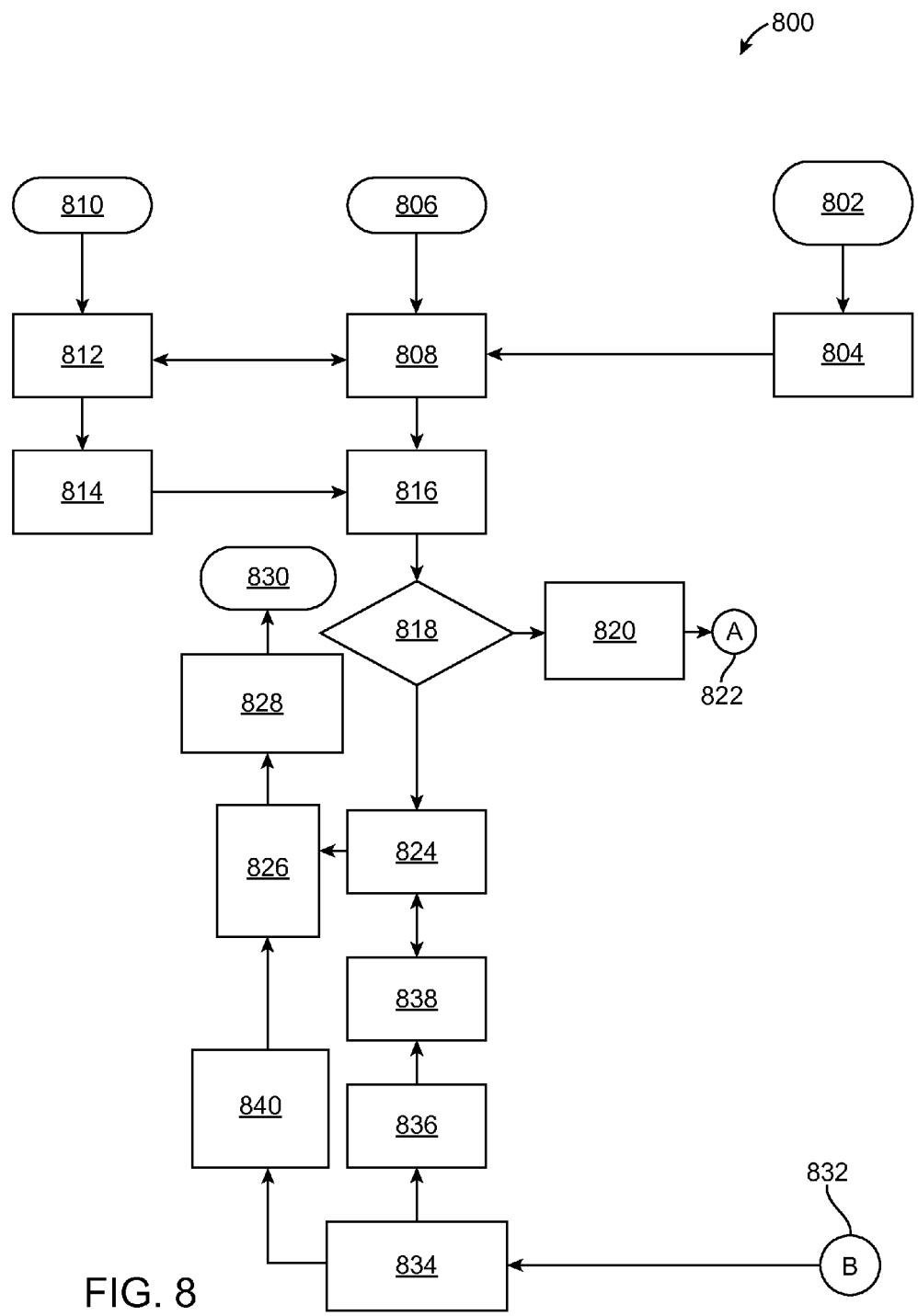
FIG. 8 illustrates a flowchart of an example process for the interactive remote guidance system described in FIG. 7, according to certain aspects of the subject technology.

FIG. 8 illustrates a flowchart of an example process for the interactive remote guidance system described in FIG. 7, according to certain aspects of the subject technology. The example process 800 is provided merely as an example and additional or fewer steps can be performed in similar or alternative orders, or in parallel, within the scope of the various embodiments described in this specification. The illustration allows for the gateway to rout subscriptions and data requested by the clients to increase the speed at which clients receive data and to minimize the amount of data sent over the communication link between the first computing device and the clients.

In step 802, the navigation engine implemented on a vessel server (e.g., the OARS unit 102 of FIG. 1) can be started (or initialized). The navigation engine can generate project information relating to at least the control of an anchor position for the sea vessel (e.g., the sea vessel 301). In some aspects, a gateway server 806, communicatively coupled to the vessel server, can add the project information from the navigation engine to its internal project list 808. In an aspect, the project list relates to one or more ongoing operations for any number of sea vessels. In addition, a client computing device, communicatively coupled to the gateway server, can be started or initialized 810. The client computing device can receive the project list from the gateway server 812. As such, the client computing device can select a particular project from the project list 814. In turn, the gateway server can add the client computing device along with its subscriptions to an internal recipient list for navigation engine data 816. The gateway server can determine whether any of these subscriptions already exist 818. If a subscription does not already exist, the gateway server can pass these new subscriptions on to the navigation engine 820. In this respect, the gateway server, acting as a client, forwards the determined subscriptions to step 822, corresponding to step 632 of FIG. 6 which adds the subscriptions to the subscription list maintained by the navigation engine for this particular client.

If a requested subscription does already exist, the gateway server can obtain stored (cached) navigation engine data for that particular subscription 824. In turn, the gateway server can send the obtained data to the requesting client computing device 826. As such, the sent data is received by the client computing device 828, and then displayed on a corresponding kiosk display 830.

In some aspects, the gateway server accesses the stored data 838, such as writing to a memory or reading from the memory. In this respect, the gateway server can receive the subscribed data at step 832, which corresponds to step 622 of FIG. 6 where the navigation engine sends the navigation engine data in response to the subscriptions of the requesting client computing devices. Once the data is received from the navigation engine 834, the gateway server can store the received data 836. The gateway server can store the data in local memory or in a data structure located external to the gateway server. In an aspect, the gateway server can directly send the received data to each client computing device subscribed to the data 840. In turn, the process proceeds to step 826 to send the data to the client computing device.

Figure 9:
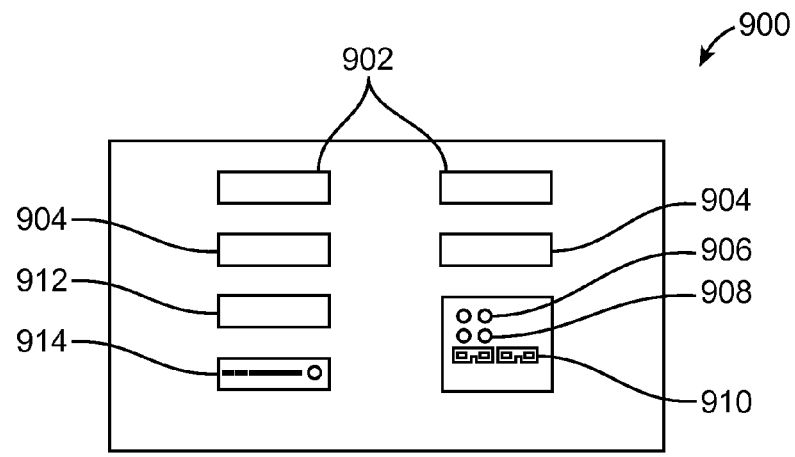
FIG. 9 illustrates an example of a computing device, according to certain aspects of the subject technology.

FIG. 9 illustrates an example of an interactive remote guidance system on a computing device 900, according to certain aspects of the subject technology. The computing device 900 includes one or more satellite position receivers 902, at least one software module 904, a communication component 906, a satellite communication component 908, a communication interface 910, an automatic identification system (AIS) component 912, and a network switch component 914. The one or more satellite position receivers 902 can include dual GPS/GNSS enabled receivers for receiving satellite data relating to geographical positioning of a sea vessel (e.g., the sea vessel 301 described in FIG. 3). The at least one software module 904 can include multiple processors configured to run respective portions of the software or operate in redundancy to provide fail-safe operations. The communication component 906 can include an interface for wired (e.g., Ethernet) or wireless (e.g., wide-area networking, local-area networking, personal-area networking) connection to nearby devices (e.g., the display device 303 described in FIG. 3). The satellite communication component 908 can include one or more modules for processing the satellite data used for communications. The satellite communication receivers 902 use one or more antennas onboard the vessel to receive GNSS data. The communication interface 910 can include a receiver, a transmitter and/or a transceiver for communicating to/from one or more remote servers and/or client computing devices. The AIS component 912 can be used to receive information about other nearby vessels that have not been configured to work with the OARS system. The network switch component 914 can be a router configured to switch communication signals to/from the computing device 900 to respective communication ports (e.g., the communication interface 910).

Figure 10:
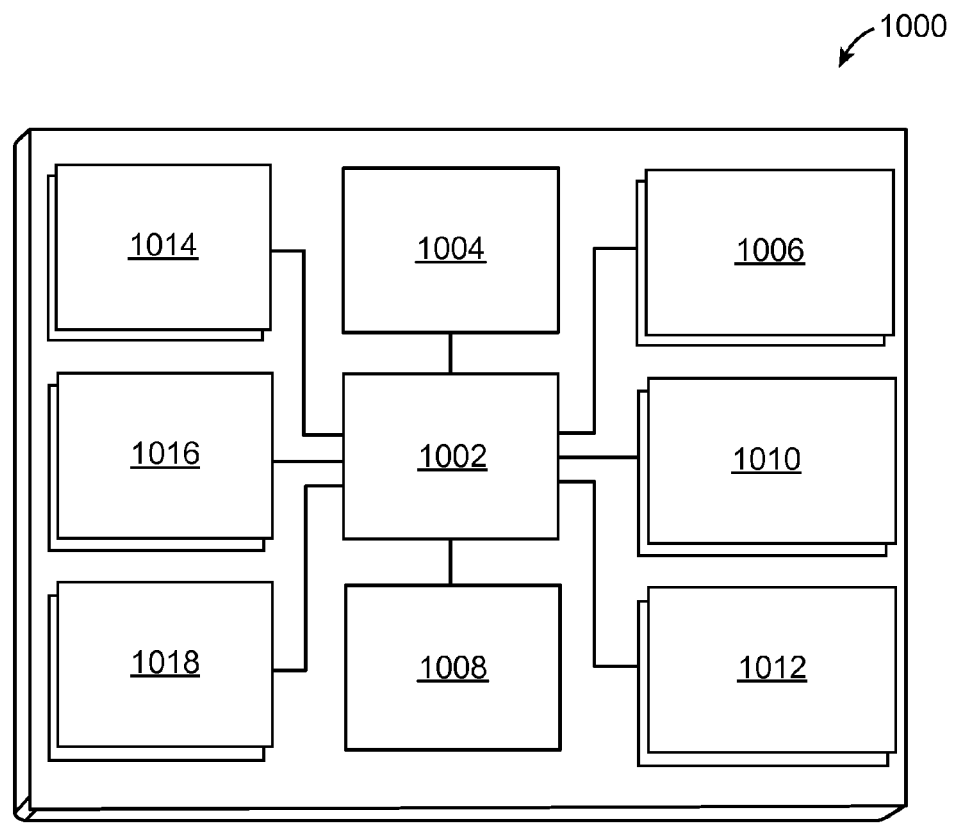
FIG. 10 illustrates an example configuration of components of a computing device, according to certain aspects of the subject technology.

FIG. 10 illustrates a logical arrangement of a set of general components of an example computing device 1000 (e.g., the computing device 502 described in FIG. 5 or the computing device 900 described in FIG. 9). In this example, the computing device 1000 includes a processor 1002 for executing instructions that can be stored in a memory device or element 1004. As would be apparent to one of ordinary skill in the art, the device can include many types of memory, data storage, or non-transitory computer-readable storage media, such as a first data storage for program instructions for execution by the processor 1002, a separate storage for navigation data, a removable memory for sharing information with other devices, etc. The computing device 1000 typically will include some type of display element 1008, such as a touch screen or liquid crystal display (LCD). As discussed, the device in many embodiments will include at least one image capture element 1006 such as a camera or infrared sensor that is able to project images or other objects in the vicinity of the computing device 1000. Methods for capturing images or video using a camera element with a computing device are well known in the art and thus will not be discussed herein in detail. It should be understood that image capture can be performed using a single image, multiple images, periodic imaging, continuous image capturing, image streaming, etc. Further, the computing device 1000 can include the ability to start and/or stop image capture, such as when receiving a command from a user, application, or other device. The computing device 1000 similarly can include at least one audio capture component 1010, such as a mono or stereo microphone or microphone array, operable to capture audio information from at least one primary direction. A microphone can be a unidirectional or omnidirectional microphone, as known for such devices.

In some embodiments, the computing device 1000 can include one or more communication elements (not shown), such as a WI-FI™, BLUETOOTH®, radio frequency (RF), wired, or wireless communication system. The computing device 1000 in many embodiments can communicate with a network, such as the Internet, and can be able to communicate with other such devices. In some embodiments the computing device 1000 can include at least one additional input device able to receive conventional input from a user. This conventional input can include, for example, a push button, touch pad, touch screen, wheel, joystick, keyboard, mouse, keypad, or any other such device or element whereby a user can input a command to the computing device 1000. In some embodiments, however, the computing device 1000 may not include any buttons at all, and might be controlled only through a combination of visual and audio commands, such that a user can control the computing device 1000 without having to be in contact with the computing device 1000.

The computing device 1000 also can include at least one orientation or motion sensor 1012. As discussed, such a sensor can include an accelerometer or gyroscope operable to detect an orientation and/or change in orientation, or an electronic or digital compass, which can indicate a direction in which the computing device 1000 is determined to be facing. The mechanism(s) also (or alternatively) can include or comprise a global positioning system (GPS) or similar positioning element operable to determine relative coordinates for a position of the computing device 1000. The computing device 1000 can include other elements as well, such as elements that enable location determinations through triangulation or another such approach. These mechanisms can communicate with the processor 1002, whereby the computing device 1000 can perform any of a number of actions described or suggested herein.

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as can be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a web server, the web server can run any of a variety of server or mid-tier applications, including HTTP servers, FTP servers, CGI servers, data servers, Java servers, and business map servers. The server(s) also can be capable of executing programs or scripts in response requests from user devices, such as by executing one or more Web applications that can be implemented as one or more scripts or programs written in any programming language, such as Java®, C, C# or C++, or any scripting language, such as Pert, Python, or TCL, as well as combinations thereof.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system can also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

Along with the claims, other clauses are also possible. These include:

A. A computing device (502, 900, 1000) for providing guidance of a sea vessel (301), the computing device (502, 900, 1000) comprising: at least one processor (1002); and memory (1004) storing instructions that, when executed by the at least one processor (1002), cause the computing device (502, 900, 1000) to: request, from a second computing device (306, 309, 900, 1000), action instructions regarding an intended course and action plan for the sea vessel (301); send data to a display device (303) to cause a prompt to be displayed on the display device (303) based at least in part on the action instructions, the prompt including one or more options regarding the action instructions; receive an input based at least in part on the prompt, the input including a selection of at least one of the one or more options, the input being stored in the memory (1004); and send state information of the sea vessel (301) to the second computing device (306, 309, 900, 1000) or to another computing device (900, 1000), the state information including the stored input and location information of the sea vessel (301).

B. The computing device (502, 900, 1000) of clause A, wherein the action instructions further cause the computing device to: obtain the location information from at least one global navigation satellite (304) system (GNSS) receiver, the location information relating to a geographical position of the sea vessel (301); obtain survey data relating to a seafloor environment, the survey data including location information for one or more objects associated with the seafloor environment; obtain navigation data relating to the anchoring of the sea vessel (301) including positioning information of an intended location of an anchor position; provide navigation information to the display device (303) regarding the anchor position; provide, upon arrival in a proximate location of the anchor position, a prompt that requests confirmation of deployment of an anchor; store, upon receipt of the confirmation of the deployment of the anchor, an actual location of the anchor position where the anchor was deployed; and send the actual location of the anchor position to the second computing device (306, 309, 900, 1000) or to another computing device (900, 1000).

C. The computing device (502, 900, 1000) of clause B, wherein the action instructions further cause the computing device (502, 900, 1000) to: cause at least one of the state information and the navigation data to be displayed on the display device (303).

D. The computing device (502, 900, 1000) of any one of clauses A-C, wherein the state information includes one or more of a position of the sea vessel (301), a heading of the sea vessel (301), map data and subscription information.

E. The computing device (502, 900, 1000) of any one of clauses A-D, wherein the action instructions are received via a gateway device (305) that is communicatively coupled between the computing device (502, 900, 1000) and the second computing device (306, 309, 900, 1000), and the gateway device (305) is located outside of the sea vessel (301).

E. The computing device (502, 900, 1000) of any one of clauses A-E, wherein the location information includes one or more of inertial data of the sea vessel (301), a trajectory of the sea vessel (301), an orientation of the sea vessel (301) and a geographical coordinate of the sea vessel (301).

G. The computing device (502, 900, 1000) of any one of clauses A-F, wherein the action instructions include instructions corresponding to a type of sea vessel (301).

H. The computing device (502, 900, 1000) of clause G, wherein the type of sea vessel (301) includes one or more of a dive boat, a derrick barge, a pipe-laying barge, a drill ship, and a seismic survey vessel.

I. The computing device (502, 900, 1000) of any one of clauses A-H, wherein the at least one action instruction includes an instruction for deploying or retrieving an anchor or mooring of the sea vessel (301).

J. The computing device (502, 900, 1000) of any one of clauses A-I, wherein the action instructions further cause the computing device (502, 900, 1000) to: facilitate a request for updated action instructions from the second computing device (306, 309, 900, 1000) based upon updated information from at least one of the vessel, weather conditions, or change in action plan.

K. A computer-implemented method of providing guidance of a sea vessel (301) on a computing device (502, 900, 1000), the method comprising: requesting, from a second computing device (306, 309, 900, 1000), action instructions regarding an intended course and action plan for the sea vessel (301); sending data to a display device (303) to cause a prompt to be displayed on the display device (303) based at least in part on the action instructions, the prompt including one or more options regarding the action instructions; receiving an input based at least in part on the prompt, the input including a selection of at least one of the one or more options, the input being stored in memory (1004); and sending state information of the sea vessel (301) to the second computing device (306, 309, 900, 1000) or to another computing device (900, 1000), the state information including the stored input and location information of the sea vessel (301).

L. The computer-implemented method of clause K, further comprising: obtaining the location information from at least one global navigation satellite (304) system (GNSS) receiver, the location information relating to a geographical position of the sea vessel (301); obtaining survey data relating to a seafloor environment, the survey data including location information for one or more objects associated with the seafloor environment; obtaining navigation data relating to the anchoring of the sea vessel (301) including positioning information of an intended location of an anchor position; providing navigation information to the display device (303) regarding the anchor position; providing, upon arrival in a proximate location of the anchor position, a prompt that requests confirmation of deployment of an anchor; storing, upon receipt of the confirmation of the deployment of the anchor, an actual location of the anchor position where the anchor was deployed; and sending the actual location of the anchor position to the second computing device (306, 309, 900, 1000) or to another computing device (900, 1000).

M. The computer-implemented method of any one of clauses K-L, further comprising: causing at least one of the state information and the navigation data to be displayed on the display device (303).

N. The computer-implemented method of any one of clauses K-M, wherein the action instructions are received via a gateway device (305) that is communicatively coupled between the computing device (502, 900, 1000) and the second computing device (306, 309, 900, 1000), and the gateway device (305) is located outside of the sea vessel (301).

O. The computer-implemented method of any one of claims K-N, further comprising: facilitating a request for updated action instructions from the second computing device (306, 309, 900, 1000) based upon updated information from at least one of the vessel, weather conditions, or change in action plan.

P. A computing device (502, 900, 1000) for facilitating remote guidance of a sea vessel (301), the computing device (502, 900, 1000) comprising: at least one processor (1002); and memory (1004) storing instructions that, when executed by the at least one processor (1002), cause the computing device (502, 900, 1000) to perform operations, the operations comprising: obtaining a project list from a gateway server (305), the project list relating to one or more ongoing projects on one or more sea vessels (301); receiving a subscription list from one or more client computing devices; obtaining navigation data stored in the memory (1004) if one or more subscriptions exist, the navigation data generated by the gateway server (305); sending the navigation data to the one or more client computing devices; and causing the sent navigation data to be displayed on a display device (303) of the one or more client computing devices.

Q. The computing device (502, 900, 1000) of clause P, wherein the navigation data relates to the anchoring of the sea vessel (301) including positioning information of an intended location of an anchor position.

R. The computing device (502, 900, 1000) of any one of clauses P-Q, wherein the instructions further cause the computing device (502, 900, 1000) to perform operations comprising: subscribing to receive the navigation data from the gateway server (305) when no subscriptions exist.

S. The computing device (502, 900, 1000) of any one of clauses P-R, wherein the instructions further cause the computing device (502, 900, 1000) to perform operations comprising: receiving the navigation data from the gateway server (305); storing the received navigation data in the memory (1004); sending the stored navigation data to the one or more client computing devices subscribed to receive the navigation data; and causing the received navigation data to be displayed on a user interface associated with the gateway server (305).

T. The computing device (502, 900, 1000) of any one of clauses P-S, wherein the instructions further cause the computing device (502, 900, 1000) to perform operations comprising: establishing a wireless communication link to a plurality of server computing devices, and each of the plurality of server computing devices is located on a respective sea vessel (301); and facilitating the wireless communication link between the plurality of server computing devices and the one or more client computing devices.

U. The computing device (502, 900, 1000) of any one of clauses A-J, wherein the action instructions include at least one navigational instruction.

V. The computing device (502, 900, 1000) of any one of clauses A-J or U, wherein the action instructions include at least one deployment instruction.

W. The computer-implemented method of any one of clauses K-O, wherein the action instructions include at least one navigational instruction.

X. The computer-implemented method of any one of clauses K-O or W, wherein the action instructions include at least one deployment instruction.

Y. A remote navigational control system for a sea vessel (301), the system comprising: a local server unit (102) contained within a sea vessel (301), the local server unit (102) having a processing unit (1002) and storage unit (1004), the local server unit (102) having modules to process position data of the sea vessel (301); the local server unit (102) communicating with a user interface (114); a second server unit (305) remote from the local server unit (102), the second server unit (305) being outside of the sea vessel (301), the local server unit (102) processing instructions from the second server unit (305) consisting of instructions selected from among only a first set of instructions, and the local server unit (102) processing instructions from the user interface (114) consisting of instructions selected from among only a second set of instructions, wherein the first and second set of instructions are not identical.

Z. The remote navigational control system of clause Y, wherein the local server unit (102) has undersea map data saved thereon.

AA. The remote navigational control system of clause Z, wherein the local server unit (102) receives Global navigational system (GPS) data and processes the GPS data in relation to map data and a position of the vessel on the user interface (114).

BB. The remote navigational control system of clause AA, wherein the local server unit (102) receives inertial information regarding the sea vessel (301).

CC. The remote navigational control system of any one of clauses Y-BB, wherein the second set of instructions is configurable by the second server to include specified instructions.

DD. The remote navigational control system of any one of clauses Y-CC, wherein the second server is capable of configuring the second set of instructions to include instructions particularized to the type of sea vessel (301).

EE. The remote navigational control system of any one of clauses Y-DD, wherein the remote server (305) is capable of configuring the second set of instructions to include instructions particularized to whether the sea vessel (301) is a dive boat or derrick barge.

FF. The remote navigational control system of any one of clauses Y-EE, wherein the second set of instructions includes instructions to adjust map viewpoint on the display screen (303a).

GG. The remote navigational control system of any one of clauses Y-FF, wherein the second set of instructions includes instructions to lift or release anchor or mooring.

HH. The remote navigational control system of any one of clauses Y-GG, wherein the second set of instructions excludes configuring or administering or quality control of the server.

II. The remote navigational control system of any one of clauses Y-HH, wherein the first set of instructions overlaps with the second set of instructions, but the first set of instructions and the second set of instructions are not identical.

JJ. The remote navigational control system of any one of clauses Y-II, wherein the first set of commands does not overlap with the second set of commands.

KK. A remote navigational control system for a sea vessel (301), the system comprising: a sea vessel server unit (102) contained within a sea vessel (301), the sea vessel server unit (102) having a processing unit (1002) connected with a storage unit (1004); the storage unit (1004) containing undersea map data, the sea vessel server communicating with an operator interactive unit having a display screen (303a), a processing unit (1002) and an input device capable of receiving input from an operator, the sea vessel server receiving commands from the interactive unit; the sea vessel server unit (102) receives global positioning data from a plurality of global position receivers on the sea vessel (301), a remote server (305) having a processor (1002), the remote server (305) wirelessly issuing commands to the sea vessel unit; the sea vessel server processing unit (1002) processes global positioning data vessel in relation to the undersea map data and from the processing, displays vessel position on the display screen (303a); wherein the sea vessel server unit (102) receives commands from among a first of commands received from the remote server (305), and receives commands from among a second set commands received from the operator interactive unit, wherein the first set of commands is different from the second set of commands.

LL. The remote navigational control system of clause KK, wherein the sea vessel server unit (102) receives inertial information regarding the sea vessel (301), and the processing unit (1002) processes global positioning data and inertial information in relation to the undersea map data and based on the processing, displays vessel position on the display screen (303a).

MM. The remote navigational control system of any one of clauses KK-LL, wherein the first set of commands overlaps with the second set of commands, but the first set of commands and the second set of commands are not identical.

NN. The remote navigational control system of any one of clauses KK-WW, wherein the first set of commands does not overlap with the second set of commands.

OO. The remote navigational control system of any one of clauses KK-NN, wherein the second set of commands is a limited subset of the first set of commands.

PP. The remote navigational control system of any one of clauses KK-OO, wherein the second set of commands is configurable by the remote server (305).

QQ. The remote navigational control system of any one of clauses KK-PP, wherein the remote server (305) is capable of configuring the second set of commands to include a limited set of commands depending on the type of sea vessel (301).

RR. The remote navigational control system of any one of clauses KK-QQ, wherein the remote server (305) is capable of configuring the second set of commands to include a limited set of commands particularized to whether the sea vessel (301) is a dive boat or derrick barge.

SS. The remote navigational control system of any one of clauses KK-RR, wherein the second set of commands includes commands to adjust map viewpoint on the display screen (303a).

TT. The remote navigational control system of any one of clauses KK-SS, wherein the second set of commands includes commands to lift or release anchor or mooring.

UU. The remote navigational control system of any one of clauses KK-TT, wherein the second set of commands excludes configuring or administering or quality control of the sea vessel server.

VV. The remote navigational control system of any one of clauses KK-UU, wherein the first set of commands includes configuring, administering or quality control of the sea vessel server.

WW. The remote navigational control system of any one of clauses KK-VV, wherein the sea vessel server is enclosed by a body having no display screen (303a) physically connected thereto.

XX. The remote navigational control system of any one of clauses KK-WW, wherein the sea vessel server communicates with the operator interactive unit wirelessly.

YY. A method for remote navigational control a sea vessel (301), the method comprising: securing a vessel server unit (102) in a sea vessel (301), the vessel server unit (102) having a processor (1002) with a storage unit (1004) and modules saved on the storage unit (1004) for processing position data of the sea vessel (301), the vessel server unit (102) communicating with a user interface (114) and displaying position of the vessel on the user interface (114); placing a second server (305) on-shore remote from the vessel server unit (102), the vessel server unit (102) receiving instructions from the second server (305) consisting of instructions selected from among only a first set of instructions, and the vessel server unit (102) receiving instructions from the user interface (114) consisting of instructions selected from among only a second set of instructions, wherein the first and second set of instructions are not identical.

The specification and drawings are to be regarded in an illustrative rather than a restrictive sense. It will, however, be evident that various modifications and changes can be made thereunto without departing from the broader scope of the subject disclosure as set forth in the claims.

What is claimed is:

1. A computing device for providing guidance of a sea vessel, the computing device comprising:
at least one processor; and
memory storing instructions that, when executed by the at least one processor, cause the computing device to:
obtain survey data relating to a surveyed seafloor environment, the survey data including location information for one or more objects associated with the seafloor environment;
request, from a second computing device remotely located from the sea vessel, action instructions regarding an intended course and action plan for the sea vessel, the action instructions based, at least in part, on the obtained survey data;
send data to a display device to cause a prompt to be displayed on the display device based at least in part on the action instructions, the prompt including one or more options regarding the action instructions;
receive an input based at least in part on the prompt, the input including a selection of at least one of the one or more options, the input being stored in the memory; and
send state information of the sea vessel to the second computing device or to another remotely located computing device, the state information including the stored input and location information of the sea vessel.

2. The computing device of claim 1, wherein the action instructions further cause the computing device to:
obtain the location information from at least one global navigation satellite system (GNSS) receiver, the location information relating to a geographical position of the sea vessel;
obtain navigation data relating to the anchoring of the sea vessel including positioning information of an intended location of an anchor position;
provide navigation information to the display device regarding the anchor position;
provide, upon arrival in a proximate location of the anchor position, a prompt that requests confirmation of deployment of an anchor;
store, upon receipt of the confirmation of the deployment of the anchor, an actual location of the anchor position where the anchor was deployed; and send the actual location of the anchor position to the second computing device or to the another remotely located computing device.

3. The computing device of claim 2, wherein the action instructions further cause the computing device to:
cause at least one of the state information and the navigation data to be displayed on the display device.

4. The computing device of claim 1, wherein the state information includes one or more of a position of the sea vessel, a heading of the sea vessel, map data and subscription information.

5. The computing device of claim 1, wherein the action instructions are received via a gateway device that is communicatively coupled between the computing device and the second computing device, and the gateway device is located outside of the sea vessel.

6. The computing device of claim 5, wherein the gateway device views and controls the display device in real-time.

7. The computing device of claim 5, wherein the action instructions received via the gateway device are selected from a full set of instructions.

8. The computing device of claim 1, wherein the location information includes one or more of inertial data of the sea vessel, a trajectory of the sea vessel, an orientation of the sea vessel and a geographical coordinate of the sea vessel.

9. The computing device of claim 1, wherein the action instructions include instructions corresponding to a type of sea vessel.

10. The computing device of claim 9, wherein the type of sea vessel includes one or more of a dive boat, a derrick barge, a pipe-laying barge, a drill ship, and a seismic survey vessel.

11. The computing device of claim 1, wherein the at least one action instruction includes an instruction for deploying or retrieving an anchor or mooring of the sea vessel.

12. The computing device of claim 1, wherein the action instructions further cause the computing device to:
facilitate a request for updated action instructions from the second computing device based upon updated information from at least one of the vessel, weather conditions, or change in action plan.

13. The computing device of claim 1, wherein the action instructions received from the second computing device are a subset of the full set of instructions.

14. The computing device of claim 1, wherein the action instructions include at least one navigational instruction.

15. The computing device of claim 1, wherein the action instructions include at least one deployment instruction.

16. A computer-implemented method of providing guidance of a sea vessel on a computing device, the method comprising:
obtaining survey data relating to a surveyed seafloor environment, the survey data including location information for one or more objects associated with the seafloor environment;
requesting, from a second computing device remotely located from the sea vessel, action instructions regarding an intended course and action plan for the sea vessel;
sending data to a display device to cause a prompt to be displayed on the display device based at least in part on the action instructions, the prompt including one or more options regarding the action instructions;
receiving an input based at least in part on the prompt, the input including a selection of at least one of the one or more options, the input being stored in memory; and
sending state information of the sea vessel to the second computing device or to another remotely located computing device, the state information including the stored input and location information of the sea vessel.

17. The computer-implemented method of claim 16, further comprising:
obtaining the location information from at least one global navigation satellite system (GNSS) receiver, the location information relating to a geographical position of the sea vessel;
obtaining navigation data relating to the anchoring of the sea vessel including positioning information of an intended location of an anchor position;
providing navigation information to the display device regarding the anchor position;
providing, upon arrival in a proximate location of the anchor position, a prompt that requests confirmation of deployment of an anchor;
storing, upon receipt of the confirmation of the deployment of the anchor, an actual location of the anchor position where the anchor was deployed; and
sending the actual location of the anchor position to the second computing device or to the another remotely located computing device.

18. The computer-implemented method of claim 16, further comprising:
causing at least one of the state information and the navigation data to be displayed on the display device.

19. The computer-implemented method of claim 16, wherein the action instructions are received via a gateway device that is communicatively coupled between the computing device and the second computing device, and the gateway device is located outside of the sea vessel.

20. The computer-implemented method of claim 19, wherein the gateway device views and controls the display device in real-time.

21. The computer-implemented method of claim 19, wherein the action instructions received via the gateway device are selected from a full set of instructions.

22. The computer-implemented method of claim 16, wherein the state information includes one or more of a position of the sea vessel, a heading of the sea vessel, map data and subscription information.

23. The computer-implemented method of claim 16, wherein the location information includes one or more of inertial data of the sea vessel, a trajectory of the sea vessel, an orientation of the sea vessel and a geographical coordinate of the sea vessel.

24. The computer-implemented method of claim 16, wherein the action instructions include instructions corresponding to a type of sea vessel.

25. The computer-implemented method of claim 24, wherein the type of sea vessel includes one or more of a dive boat, a derrick barge, a pipe-laying barge, a drill ship, and a seismic survey vessel.

26. The computer-implemented method of claim 16, wherein the at least one action instruction includes an instruction for deploying or retrieving an anchor or mooring of the sea vessel.

27. The computer-implemented method of claim 16, wherein the action instructions further comprising:
facilitating a request for updated action instructions from the second computing device based upon updated information from at least one of the vessel, weather conditions, or change in action plan.

28. The computer-implemented method of claim 16, wherein the action instructions received from the second computing device are a subset of the full set of instructions.

29. The computer-implemented method of claim 16, wherein the action instructions include at least one navigational instruction.

30. The computer-implemented method of claim 16, wherein the action instructions include at least one deployment instruction.

31. A non-transitory computer readable medium for providing guidance of a sea vessel, storing computer-readable instructions thereon, which when executed by a computing device, cause the computing device to:
obtain survey data relating to a surveyed seafloor environment, the survey data including location information for one or more objects associated with the seafloor environment;
request, from a second computing device remotely located from the sea vessel, action instructions regarding an intended course and action plan for the sea vessel, the action instructions based, at least in part, on the obtained survey data;
send data to a display device to cause a prompt to be displayed on the display device based at least in part on the action instructions, the prompt including one or more options regarding the action instructions;
receive an input based at least in part on the prompt, the input including a selection of at least one of the one or more options, the input being stored in the memory; and
send state information of the sea vessel to the second computing device or to another remotely located computing device, the state information including the stored input and location information of the sea vessel.

32. The non-transitory computer readable medium of claim 31, wherein the action instructions further cause the computing device to:
obtain the location information from at least one global navigation satellite system (GNSS) receiver, the location information relating to a geographical position of the sea vessel;
obtain navigation data relating to the anchoring of the sea vessel including positioning information of an intended location of an anchor position;
provide navigation information to the display device regarding the anchor position;
provide, upon arrival in a proximate location of the anchor position, a prompt that requests confirmation of deployment of an anchor;
store, upon receipt of the confirmation of the deployment of the anchor, an actual location of the anchor position where the anchor was deployed; and
send the actual location of the anchor position to the second computing device or to the another remotely located computing device.

33. The non-transitory computer readable medium of claim 31, wherein the action instructions further cause the computing device to:
cause at least one of the state information and the navigation data to be displayed on the display device.

34. The non-transitory computer readable medium of claim 31, wherein the state information includes one or more of a position of the sea vessel, a heading of the sea vessel, map data and subscription information.

35. The non-transitory computer readable medium of claim 31, wherein the action instructions are received via a gateway device that is communicatively coupled between the computing device and the second computing device, and the gateway device is located outside of the sea vessel.

36. The non-transitory computer readable medium of claim 35, wherein the gateway device views and controls the display device in real-time.

37. The non-transitory computer readable medium of claim 35, wherein the action instructions received via the gateway device are selected from a full set of instructions.

38. The non-transitory computer readable medium of claim 31, wherein the location information includes one or more of inertial data of the sea vessel, a trajectory of the sea vessel, an orientation of the sea vessel and a geographical coordinate of the sea vessel.

39. The non-transitory computer readable medium of claim 31, wherein the action instructions include instructions corresponding to a type of sea vessel.

40. The non-transitory computer readable medium of claim 39, wherein the type of sea vessel includes one or more of a dive boat, a derrick barge, a pipe-laying barge, a drill ship, and a seismic survey vessel.

41. The non-transitory computer readable medium of claim 31, wherein the at least one action instruction includes an instruction for deploying or retrieving an anchor or mooring of the sea vessel.

42. The non-transitory computer readable medium of claim 31, wherein the action instructions further cause the computing device to:
facilitate a request for updated action instructions from the second computing device based upon updated information from at least one of the vessel, weather conditions, or change in action plan.

43. The non-transitory computer readable medium of claim 31, wherein the action instructions received from the second computing device are a subset of the full set of instructions.

44. The non-transitory computer readable medium of claim 31, wherein the action instructions include at least one navigational instruction.

45. The non-transitory computer readable medium of claim 31, wherein the action instructions include at least one deployment instruction.

\* \* \* \* \*